3,284,521
PROCESS FOR THE PRODUCTION OF CYCLOHEXADIENE

Henry E. Fritz and David W. Peck, Charleston, and Robert R. Gentry, St. Albans, W. Va., assignors to Union Carbide Corporation, a corporation of New York
No Drawing. Filed Apr. 10, 1964, Ser. No. 358,946
8 Claims. (Cl. 260—666)

This invention relates to a process for producing cyclohexadiene in good yields and at high production rates.

Prior to this invention cyclohexadiene was generally produced by one of two methods. 1,3-cyclohexadiene was produced by the halogenation of cyclohexene followed by dehydrohalogenation of the resulting trans-1,2-dihalocyclohexane, and 1,4-cyclohexadiene was produced by the Birch reduction of benzene in the presence of sodium in liquid ammonia. Neither process was entirely satisfactory as a commercial process. For example, the former process suffered from slow production rates due to the difficulty in dehydrohalogenation of the trans-1,2-dihalocyclohexane, and the latter required expensive reagents. Moreover, neither process was capable of producing both the 1,3- and the 1,4-cyclohexadiene in good yields.

It has been discovered by this invention that a mixture of 1,3- and 1,4-cyclohexadiene is readily produced in good yields at high production rates by the halogenation of cyclohexane to produce predominantly dihalocyclohexanes, hereinafter referred to as "halogenated cyclohexane," followed by dehydrohalogenation of the halogenated cyclohexane.

The halogenation of cyclohexane can be conducted according to any known technique, such as photochemical or peroxide catalysis and the like. Initiation by radiation with a cobalt 60 source can also be employed. A preferred technique is the photochemical halogenation because of the ease of control of the reaction.

Any halogen can be employed, but chlorine is preferred because it is the only one which is feasible from an economic standpoint.

The general reaction conditions for the halogenation are not particularly critical, with a main factor being the rate at which the equipment employed can remove the exothermic heat of reaction from the reaction mixture. It is essential to the maintenance of high efficiencies for this step, however, that the degree of halogen substitution be maintained below 1.0 mole of halogen per mole of cyclohexane to prevent the excessive formation of polyhalocyclohexanes having more than two halogen substituents. A degree of substitution of less than 0.1 mole of halogen per mole of cyclohexane is generally undesirable because little or no dihalocyclohexane is formed at this level. The preferred degree or "depth" of halogenation is from 0.3 to 0.7 mole of halogen per mole of cyclohexane because, although the yield of dihalocyclohexane is only in the range of from about 10 to about 20 percent, the formation of higher polyhalocyclohexanes is at a minimum and efficiencies of 90 percent or higher are readily obtained for this step. The depth of halogenation is readily determined by weighing the organic mixture after removal of hydrogen halide to determine the amount of weight gain due to halogen substitution, or by vapor-phase chromatographic analysis of the reaction product.

The halogenation product is recovered by venting off the hydrogen halide formed followed by a distillation to recover unreacted cyclohexane and monohalocyclohexane which can be recycled to the halogenation reaction if desired. On further distillation the dihalocyclohexane is recovered leaving as a residue higher polyhalocyclohexanes.

The dihalocyclohexane recovered from the initial step contains all seven possible isomers. The 1,1- and the cis-1,2-isomers are formed in relatively small amounts (generally less than about 5 percent for each isomer), with the balance consisting of trans-1,2-, cis- and trans-1,3-, and cis- and trans-1,4-dihalocyclohexanes in roughly equal proportions. It is in this wide range of isomers that the advantage of the process of this invention lies. Thus, in the halogenation of cyclohexene, the principal product is trans-1,2-dihalocyclohexane, which is the most difficult of the dihalocyclohexane isomers to dehydrohalogenate. The amount of this isomer present in the dihalocyclohexane employed in the process of this invention, however, is generally less than 20 percent, thereby permitting high yields of cyclohexadiene under less strenuous conditions than those employed by the prior art.

The dihalocyclohexane fraction produced as described above is subjected to a conventional dehydrohalogenation reaction. For example, the dehydrohalogenation can be conducted catalytically employing catalysts such as barium chloride, calcium chloride, boron phosphate, ferric chloride, iron, copper chloride, zinc oxide, palladium and the like, which may be distributed on suitable support materials such as alumina, activated carbon, silica, silica-alumina and the like. The reaction conditions will vary depending upon the catalyst employed, but generally range from about 250° C. to about 450° C. and a liquid hourly space velocity of from about 0.1 to about 10.0 liters dihalocyclohexane per liter of catalyst volume per hour. Temperatures of from about 300 to about 375° C. and space velocities of from about 0.1 to about 1.0 liter per liter per hour are preferred.

As an alternative procedure, dehydrohalogenation can be effected by reaction of dihalocyclohexane with hot solid calcium hydroxide at 150 to 350° C.

The dehydrohalogenation product contains benzene, cyclohexene, unreacted dihalocyclohexane and monohalocyclohexene in addition to cyclohexadiene. After purging of hydrogen halide, the reaction product is distilled to recover a fraction containing the hydrocarbons and a residue containing the halogenated products which can be recycled to the dehydrohalogenation reaction.

Cyclohexadiene is recovered from the hydrocarbon fraction by extraction with an aqueous solution of an inorganic silver compound such as silver fluoborate or silver nitrate. The silver ion preferentially complexes with the diene, taking it into solution in the aqueous phase or, in some cases, forming a precipitate. After separating the aqueous and organic phases, the aqueous phase is distilled to liberate the cyclohexadiene.

The cyclohexadiene consists generally of a mixture of the 1,3- and 1,4-isomers in a ratio of from about 1:1 to about 3:1. These isomers, which boil at 81° C. and 88° C., respectively, can be separated by distillation if desired.

The following examples are illustrative.

Example 1

Chlorine gas was bubbled through 800 grams (9.5 moles) of cyclohexane under incandescent light from a 200 watt bulb for 20 hours, at which time the weight gain of the reaction mixture, exclusive of hydrogen chloride which was taken off over head, was 290 grams, for a depth of chlorination of 0.43 mole of chlorine per mole of cyclohexane. Cyclohexane, which was entrained with the evolved hydrogen chloride gas, was trapped and recycled to the reaction mixture. The reaction product was distilled and there were recovered four fractions consisting of 330 grams (3.93 moles) of cyclohexane, 495 grams (4.18 moles) of monochlorocyclohexane, 230 grams (1.50 moles) of dichlorocyclohexane, and 27 grams of higher boiling polychlorocyclohexanes. Thus, dichlorocyclohexane was produced in a yield of about 16 percent at an almost quantitative efficiency.

Example 2

A tubular reactor was packed with 650 milliliters of 10% barium chloride on a silica support. The catalyst bed was heated at a temperature of 335–342° C. and 1986 grams (13 moles) of dichlorocyclohexane produced in the manner described in Example 1 was fed through the catalyst bed at a rate of 0.2 liter per liter of catalyst per hour for 12 hours. There were recovered 1374 grams of organic product, which was analyzed by vapor phase chromatography. The product was then distilled to recover a hydrocarbon fraction containing benzene, cyclohexene and cyclohexadiene, which was analyzed by vapor phase chromatography. The yield of cyclohexadiene having a 1,3-isomer to 1,4-isomer ratio of 2.2:1 was 49 percent. Benzene and cyclohexene were present in a total yield of 4 percent, monochlorocyclohexene was present in a yield of 11 percent and unreacted dichlorocyclohexane amounted to 32 percent of the charge, resulting in an efficiency of 86 percent.

The dichlorocyclohexane isomer distributions in the feed and the product are set forth in tabular form below.

| Isomer | Weight percent, based on total dichlorocyclohexane | |
| --- | --- | --- |
| | Feed | Recovered |
| 1,1-dichlorocyclohexane | 2.1 | 1.1 |
| Trans-1,2-dichlorocyclohexane | 21.0 | 50.4 |
| Trans-1,3- and 1,4-dichlorocyclohexane | 41.0 | 25.6 |
| Cis-1,3-dichlorocyclohexane | 21.1 | 10.3 |
| Cis-1,2- and 1,4-dichlorocyclohexane | 13.9 | 12.6 |

From the table it is clear that the trans-1,2-dichlorocyclohexane is the most difficultly dehydrohalogenated dichlorocyclohexane isomer.

Example 3

A 1-inch diameter glass tube was packed with 158 grams of calcium chloride pellets, which occupied 22 inches of the tube's length. The tube was also packed for 15 inches on either side of the calcium chloride with silica pellets. The catalyst bed was heated to 340° C., as determined by a thermocouple located in the calcium chloride bed, and dichlorocyclohexane produced as described in Example 1 was fed to the bed at a rate of 0.2 liter of feed per liter of calcium chloride bed per hour to produce cyclohexadiene. In a second experiment, the process was repeated, except that the dichlorocyclohexane was produced by the chlorination of cyclohexene at 28–85° C. followed by distillation to obtain a dichlorocyclohexane fraction. The feed and product composition for the two experiments are summarized in tabular form below.

| Experiment | 1 | 2 |
| --- | --- | --- |
| Feed: | | |
| Total weight, grams | 320 | 241 |
| Moles dichlorocyclohexane | 2.1 | 1.51 |
| Composition, weight percent: | | |
| Monochlorocyclohexane | 2.5 | 0.2 |
| 1,1-dichlorocyclohexane | 0.8 | |
| Trans-1,2-dichlorocyclohexane | 17.0 | 94.7 |
| Trans-1,3- and 1,4-dichlorocyclohexane | 40.0 | |
| Cis-1,3-dichlorocyclohexane | 21.6 | |
| Cis-1,2- and 1,4-dichlorocyclohexane | 15.7 | [1] 1.5 |
| Total dichlorocyclohexane | 95.1 | 96.2 |
| Trichlorocyclohexanes | 2.6 | |
| Hydrocarbons | | [2] 3.6 |
| Product: Total weight, grams | 202 | 207 |
| Composition, weight percent: | | |
| Crude cyclohexadiene | 64.4 | 17.8 |
| 1,3-cyclohexadiene | 42.8 | 8.1 |
| 1,4-cyclohexadiene | 15.7 | 2.2 |
| Other hydrocarbons | 5.9 | 7.6 |
| Monochlorocyclohexenes | 12.9 | 2.9 |
| Dichlorocyclohexanes | 20.9 | 79.3 |
| Trans-1,2-dichlorocyclohexane | 16.6 | 79.3 |
| Trans-1,3- and 1,4-dichlorocyclohexane | 2.6 | |
| Cis-1,2- and 1,4-dichlorocyclohexane | 1.7 | |
| Trichlorocyclohexanes | 1.8 | |
| Yield, percent: | | |
| Total cyclohexadiene | 70.0 | 17.2 |
| 1,3-cyclohexadiene | 51.2 | 13.6 |
| 1,4-cyclohexadiene | 18.8 | 3.6 |
| Conversion, percent | 76.7 | 25.8 |
| Efficiency, percent | 91.3 | 66.6 |

[1] Cis-1,2-dichlorocyclohexane only.
[2] Cyclohexene.

From the table, it is readily apparent that the substitution of chlorinated cyclohexane for chlorinated cyclohexene results in a greatly improved process. Thus, chlorinated cyclohexane is converted to hydrocarbons at a rate which is almost triple that obtained with chlorinated cyclohexene. In addition, the yield of cyclohexadiene from chlorinated cyclohexane is over 4 times that obtained from chlorinated cyclohexene at over one-third higher efficiency.

In the foregoing examples, conversion and efficiency were calculated from the equations:

$$\text{Conversion} = \frac{A-B}{A} \times 100$$

$$\text{Efficiency} = \frac{C}{A-B} \times 100$$

wherein A is the moles of dichlorocyclohexane fed; B is the total moles of dichlorocyclohexane and monochlorocyclohexene recovered; and C is the moles of cyclohexadiene recovered.

What is claimed is:

1. In the process of producing cyclohexadiene by dehydrohalogenating a dihalocyclohexane, the improvement comprising substantially dehydrohalogenating at least one member selected from the group consisting of 1,3-dihalocyclohexane and 1,4-dihalocyclohexane from a dihalocyclohexane obtained by the halogenation of cyclohexane to a depth from 0.1–1.0 moles.

2. The method of claim 1 where said cyclohexane is halogenated to a depth from 0.3–0.7 moles.

3. A method for the production of cyclohexadiene by dehydrohalogenating a dihalocyclohexane comprising the improvement of halogenating cyclohexane to a depth from 0.1–1.0 moles to form a halogenated compound containing at least one member selected from the group consisting of 1,3-dihalocyclohexane and 1,4-dihalocyclohexane and afterwards dehydrohalogenating said halogenated compound to produce at least one member selected from the group consisting of 1,3-dicyclohexadiene and 1,4-dicyclohexadiene admixed with said halogenated compound.

4. The method of claim 3 where said cyclohexane is halogenated to a depth from 0.3–0.7 moles.

5. The method of claim 3 where said halogenated compound contains 1,2-dihalocyclohexane.

6. A method for the production of cyclohexadiene by the dehydrochlorination of dichlorocyclohexane comprising the improvement of chlorinating cyclohexane to a depth from 0.1–1.0 moles to form a chlorinated compound containing at least one member selected from the group consisting of 1,3-dichlorocyclohexane and 1,4-dichlorocyclohexane and afterwards dehydrochlorinating said chlorinated compound to produce at least one member selected from the group consisting of 1,3-dicyclohexadiene and 1,4-dicyclohexadiene admixed with said chlorinated compound.

7. The method of claim 6 where said cyclohexane is chlorinated to a depth from 0.3–0.7 moles.

8. The method of claim 6 where said chlorinated compound contains 1,2-dichlorocyclohexane.

References Cited by the Examiner

UNITED STATES PATENTS

| | | | |
|---|---|---|---|
| 2,154,049 | 4/1939 | Levine et al. | 204—163 |
| 2,182,242 | 12/1939 | Wooster | 260—666 |
| 2,287,665 | 6/1942 | Britton et al. | 204—163 |
| 2,288,580 | 6/1942 | Baehr | 260—666 |
| 2,368,495 | 1/1945 | Schiller | 204—163 |
| 2,370,342 | 2/1945 | Zellner | 204—163 |
| 2,867,671 | 1/1959 | Mullineaux | 260—666 |
| 2,905,609 | 9/1959 | Germano | 204—163 |
| 2,948,667 | 8/1960 | Limido et al. | 204—163 |
| 2,998,459 | 8/1961 | Baker | 204—163 |
| 3,189,658 | 6/1965 | Quinn | 260—666 |
| 3,201,489 | 8/1965 | Knaack | 260—666 |

FOREIGN PATENTS

| | | |
|---|---|---|
| 1,088,948 | 9/1960 | Germany. |
| 1,090,202 | 10/1960 | Germany. |

DELBERT E. GANTZ, *Primary Examiner.*

V. O'KEEFE, *Assistant Examiner.*